United States Patent
Chen et al.

(10) Patent No.: US 8,402,785 B2
(45) Date of Patent: Mar. 26, 2013

(54) METHOD AND APPARATUS FOR MEASURING SURFACE SHAPE PROFILE

(75) Inventors: Xin Chen, Corning, NY (US); Anping Liu, Big Flats, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 832 days.

(21) Appl. No.: 11/983,464

(22) Filed: Nov. 9, 2007

(65) Prior Publication Data

US 2009/0120134 A1    May 14, 2009

(51) Int. Cl.
*G01N 21/896* (2006.01)

(52) U.S. Cl. ............ 65/29.12; 250/559.12; 250/559.22; 356/601; 356/237.1; 356/239.1; 65/53; 65/90

(58) Field of Classification Search .................. 365/626, 365/625, 601; 65/158, 29.12, 377, 484; 356/601–613, 626, 625, 237.1, 239.1, 239.2, 356/239.7, 237.2; 250/559.19, 559.2, 559.22
See application file for complete search history.

(56) References Cited

U.S. PATENT DOCUMENTS

| 3,338,696 | A | 8/1967 | Dockerty | 65/145 |
| 3,682,609 | A | 8/1972 | Dockerty | 65/83 |
| 4,853,777 | A * | 8/1989 | Hupp | 348/128 |
| 5,523,889 | A * | 6/1996 | Bewsher | 359/710 |
| 6,211,488 | B1 | 4/2001 | Hoekstra et al. | 219/121.72 |
| 6,433,350 | B2 | 8/2002 | Hwang et al. | |
| 6,621,581 | B1 * | 9/2003 | Hunt et al. | 356/601 |
| 6,999,183 | B2 * | 2/2006 | Nielsen et al. | 356/612 |
| 7,053,395 | B2 * | 5/2006 | Feldman et al. | 250/559.45 |
| 2006/0021385 | A1 | 2/2006 | Cimo et al. | |
| 2006/0261118 | A1 | 11/2006 | Cox et al. | 225/96 |
| 2007/0039990 | A1 | 2/2007 | Kemmerer et al. | 225/2 |
| 2007/0223009 | A1 | 9/2007 | Erfling et al. | 356/602 |

FOREIGN PATENT DOCUMENTS

| EP | 0863380 B1 | 5/2003 |
| TW | 434399 B | 5/2001 |
| WO | WO 2005/108917 | 11/2005 |
| WO | WO 2008/028246 | 3/2008 |

OTHER PUBLICATIONS

English Translation of Search Report for Taiwan Invention Patent Application No. 097143276, dated Dec. 5, 2012.

* cited by examiner

*Primary Examiner* — Jason L Lazorcik
*Assistant Examiner* — Yana Belyaev
(74) *Attorney, Agent, or Firm* — Thomas R. Beall (57) ABSTRACT

An apparatus for measuring a shape profile of a surface of a sheet of material includes a light source for providing a light beam to be directed at the surface of the sheet of material, a linear translation stage coupled to the light source for translating the light source over the surface of the sheet of material such that the light beam, when directed at the surface, is incident on the surface at multiple positions and produces a reflected light beam at each of the multiple positions, a plurality of light receivers located at predetermined positions for selectively intercepting the reflected light beam produced at each of the multiple positions, a data acquisition device configured to receive information related to position difference between the light source and a selected one of the plurality of light receivers intercepting the reflected light beam produced at each of the multiple positions, and a data analysis device configured to correlate the position difference information to a shape profile of the surface of the sheet of material.

5 Claims, 9 Drawing Sheets

METHOD AND APPARATUS FOR MEASURING SURFACE SHAPE PROFILE

TECHNICAL FIELD

The invention relates generally to methods and apparatus for manufacturing sheets of material. More particularly, the invention relates to a method and apparatus for measuring a shape profile of a sheet of material. The invention also relates to use of such measurement method and apparatus in sheet forming processes such as fusion draw and float process.

BACKGROUND

Large sheets of materials having very flat surfaces, such as useful in making large flat panel displays or which can be diced to make other devices such as active electronic devices, photovoltaic devices, and biological arrays, are difficult to produce and handle. As an illustration, fusion draw processes, such as described in, for example, U.S. Pat. Nos. 3,338,696 and 3,682,609 issued to Dockerty, herein incorporated by reference, are known to deliver sheets of material having superior flatness and surface smoothness without the added expense of post-forming finishing operations such as lapping and polishing. However, it has been found that sheet motion in the forming zone can negatively impact the level of stress and stress variation within the sheet, possibly leading to distortion in the final product. Sheet motion in the forming zone may be attributed at least in part to sheet handling and separation processes at the bottom of fusion draw machine, or bottom of draw (BOD). For example, current mechanical processes for separating sheet at BOD involve sheet contact, sheet scoring, and sheet bending with hard or rigid devices, all of which contribute to sheet motion. The larger the sheet of material being formed, the more significant the effect of sheet motion may be on the stress level and variation within the sheet. The factors that contribute to distortion of sheets of material may take on different forms in other sheet forming and post-forming processes. To make large sheets with very flat surfaces, it is important to minimize these factors. Ideally, schemes to minimize these factors would take into account information about the shape profile of the sheet of material. It would be beneficial if such information can be readily obtained, either during sheet forming or post-forming processes.

SUMMARY

In one aspect, an apparatus for measuring a shape profile of a surface of a sheet of material comprises a light source for providing a light beam to be directed at the surface of the sheet of material. The apparatus further includes a linear translation stage coupled to the light source for translating the light source over the surface of the sheet of material such that the light beam, when directed at the surface, is incident on the surface at multiple positions and produces a reflected light beam at each of the multiple positions. The apparatus further includes a plurality of light receivers located at predetermined positions for selectively intercepting the reflected light beam produced at each of the multiple positions. The apparatus further includes a data acquisition device configured to receive information related to position difference between the light source and a selected one of the plurality of light detectors intercepting the reflected light beam produced at each of the multiple positions. The apparatus further includes a data analysis device configured to correlate the position difference information to a shape profile of the surface of the sheet of material.

In one embodiment, the light beam provided by the light source of the apparatus described above is elongated. In one embodiment, a major axis of the elongated beam is perpendicular to the translation direction of the light source. In one embodiment, an aspect ratio of the elongated beam is at least 10.

In one embodiment, a width of the light beam provided by the light source of the apparatus described above is equal to or less than 3 mm. In another embodiment, the width of the light beam provided by the light source is equal to or less than 0.5 mm.

In one embodiment, the light receivers of the apparatus described above are light detectors. In one embodiment, the light detectors are contained within a single physical device. In one embodiment, the light detectors are coupled to the translation stage such that they move in tandem with the light source.

In one embodiment, the light receives of the apparatus described above are multimode fibers coupled to a light detector.

In one embodiment, the light receivers of the apparatus are distributed along the translation direction of the light source. In one embodiment, the light receivers are arranged in a one-dimensional array. In one embodiment, the light receivers are arranged in a two-dimensional array. In one embodiment, the light receivers are staggered along the translation direction of the light source.

In one embodiment, the data analysis device of the apparatus described above resolves $$D_o + D(x) = y(x) \frac{2y'(x) + \tan\theta_o(1 - y'^2(x))}{1 - y'^2(x) + 2y'(x)\tan\theta_o}$$

for y(x), where y(x) is the shape profile, y'(x) is the derivative of y(x), $D(x)+D_0$ is the position difference between the intercepted reflected light beam and the incident light beam at each of the multiple positions, and $\theta_0$ is the angle at which the light beam is incident on the surface of the sheet of material.

In another embodiment, the data analysis device of the apparatus described above integrates $$y'(x) = \frac{D(x) + D_o}{2y(x)} - \frac{\tan\theta_o}{2}$$

to obtain y(x), where y(x) is the shape profile, y'(x) is the derivative of y(x), $D(x)+D_0$ is the position difference between the intercepted reflected light beam and the incident light beam at each of the multiple positions, and $\theta_0$ is the angle at which the light beam is incident on the surface of the sheet of material.

In yet another embodiment, the data analysis device of the apparatus described above resolves $$D'_0 + D'(x) = y(x)\left(\tan(\theta_0) + \frac{2y'(x) + \tan(\theta_0)(1 - y'^2(x))}{1 - y'^2(x) + 2y'(x)\tan\theta_0}\right)$$

for y(x), where y(x) is the shape profile, y'(x) is the derivative of y(x), $D'_0+D'(x)$ is the position difference between the intercepted reflected light beam and the incident light beam at each of the multiple positions, and $\theta_0$ is the angle at which the light beam is incident on the surface of the sheet of material.

In one embodiment, the apparatus described above further includes a beam shaper optically coupled to the light source, wherein the beam shaper converts a circular beam provided by the light source into an elongated beam.

In one embodiment, the apparatus described above further includes at least one narrow band pass filter optically coupled to the light receivers to remove noise from the intercepted reflected light beams.

In another aspect, a method for measuring the shape profile of a surface of a sheet of material comprises providing a light beam which is incident on the surface of the sheet of material. The method includes translating the incident light beam substantially linearly over the surface in a predetermined measurement direction such that the incident light beam is incident on the surface at multiple positions and produces a reflected light beam at each of the multiple positions. The method also includes intercepting the reflected light beam produced at each of the multiple positions, receiving information related to position difference between the intercepted reflected light beams and the incident light beam at each of the multiple positions, and correlating the position difference information to the shape profile of the surface of the sheet of material.

In one embodiment, correlating the position difference data to the shape profile comprises resolving $$D_o + D(x) = y(x) \frac{2y'(x) + \tan\theta_o(1 - y'^2(x))}{1 - y'^2(x) + 2y'(x)\tan\theta_o}$$

for y(x), where y(x) is the shape profile, y'(x) is the derivative of y(x), $D(x)+D_0$ is the position difference between the intercepted reflected light beam and the incident light beam at each of the multiple positions, and $\theta_0$ is the angle at which the light beam is incident on the surface of the sheet of material.

In another embodiment, correlating the position difference data to the shape profile comprises integrating $$y'(x) = \frac{D(x) + D_o}{2y(x)} - \frac{\tan\theta_o}{2}$$

to obtain y(x), where y(x) is the shape profile, y'(x) is the derivative of y(x), $D(x)+D_0$ is the position difference between the intercepted reflected light beam and the incident light beam at each of the multiple positions, and $\theta_0$ is the angle at which the light beam is incident on the surface of the sheet of material.

In yet another embodiment, correlating the position difference data to the shape profile comprises resolving $$D'_0 + D'(x) = y(x)\left(\tan(\theta_0) + \frac{2y'(x) + \tan(\theta_0)(1 - y'^2(x))}{1 - y'^2(x) + 2y'(x)\tan\theta_0}\right)$$

for y(x), where y(x) is the shape profile, y'(x) is the derivative of y(x), $D(x)+D_0$ is the position difference between the intercepted reflected light beam and the incident light beam at each of the multiple positions, and $\theta_0$ is the angle at which the light beam is incident on the surface of the sheet of material.

In one embodiment, the incident light beam described in the method above is provided as an elongated light beam with an aspect ratio of at least 10.

In yet another aspect, a glass manufacturing system comprises a fusion draw machine for forming a glass sheet and an apparatus as described above adjacent to the fusion draw machine for measuring a shape profile of a surface of the glass sheet.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Figure 1:
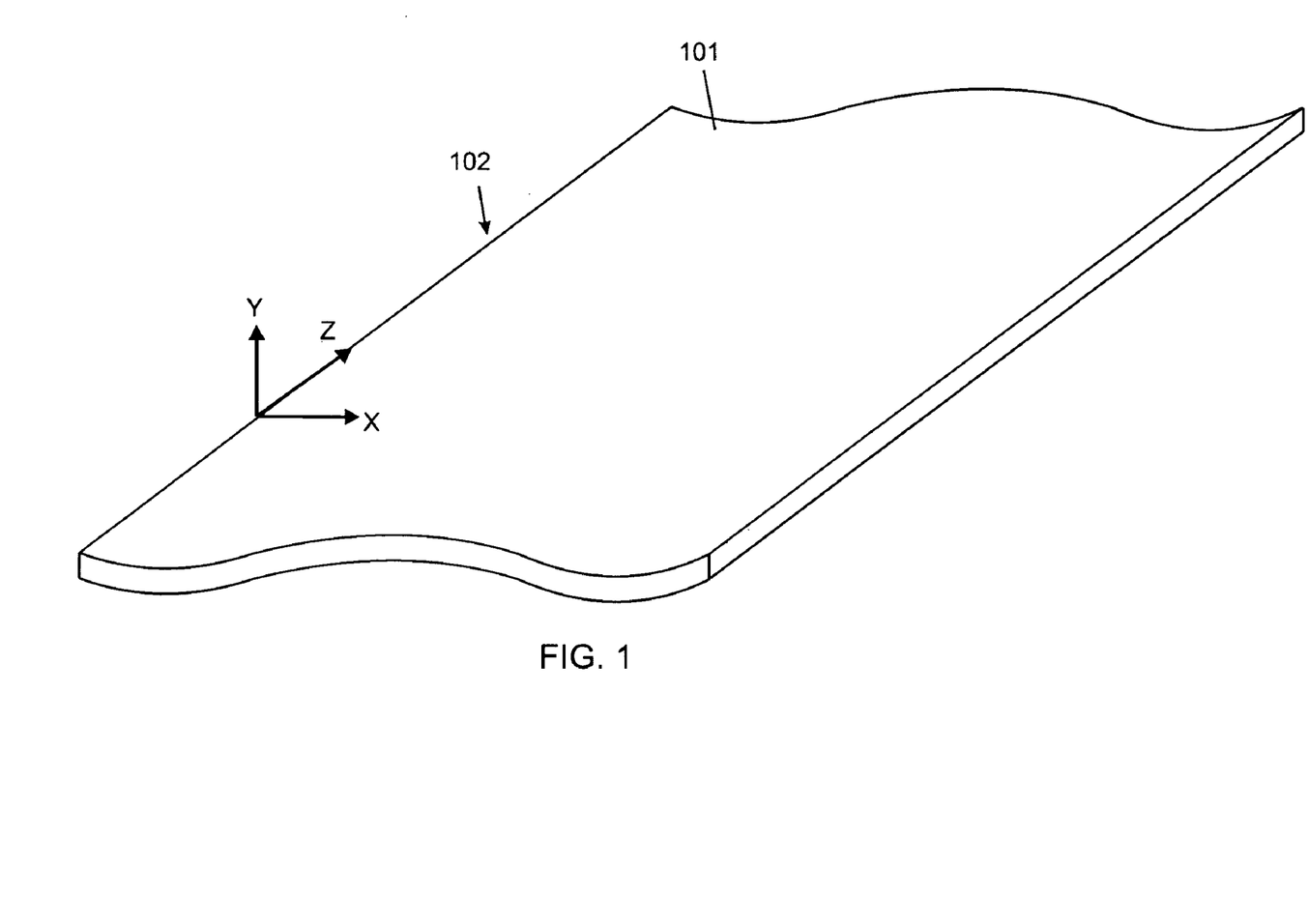
FIG. 1 is a perspective view of a sheet of material.
Figure 2:
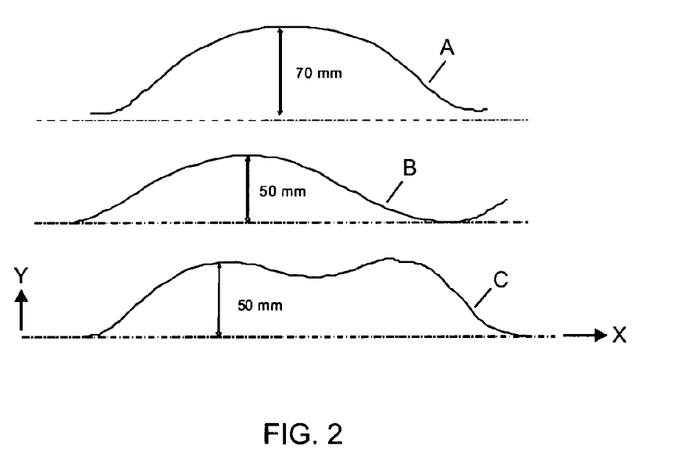
FIG. 2 illustrates shape profiles typically found in large glass sheets.

FIG. 1 depicts a sheet of material 102 having a surface 101 whose shape profile is to be measured. The shape profile shown in FIG. 1 is arbitrary. The sheet of material 102 may be made of any suitable material for the intended application, provided that the surface 101 is capable of reflecting a light beam. Examples of materials that may be used in the sheet of material 102 include glass, glass-ceramic, and plastic materials. These materials may have optical properties which render the sheet of material 102 suitable for transmission or detection of light. An XYZ coordinate system is provided, wherein a first dimension of the sheet of material 102 lies along the X-axis, a second dimension of the sheet of material 102 lies along the Y-axis, and a third dimension of the sheet of material 102 lies along the Z-axis, where X-, Y-, and Z-axes are orthogonal. As an example, the first dimension of the sheet of material 100 may be the width of the sheet of material 102, the second dimension of the sheet of material 102 may be the thickness of the sheet of material 102, and the third dimension of the sheet of material 102 may be the length of the sheet of material 102. In one example, a large sheet of material such as useful in making a large flat panel display may have at least one dimension, e.g., width or length, exceeding 2000 mm. In another example, a large sheet of material such as useful in making a large flat panel display has at least one dimension, e.g., width or length, selected from 2300 mm, 2550 mm, 2800 mm, and 3200 mm. FIG. 2 shows actual examples of shape profiles that have been observed in the XY plane of a glass sheet having a total width of 2300 mm. The shape profile A is bell-shaped. The shape profile B is S-shaped. The shape profile C is M-shaped.

Figure 3:
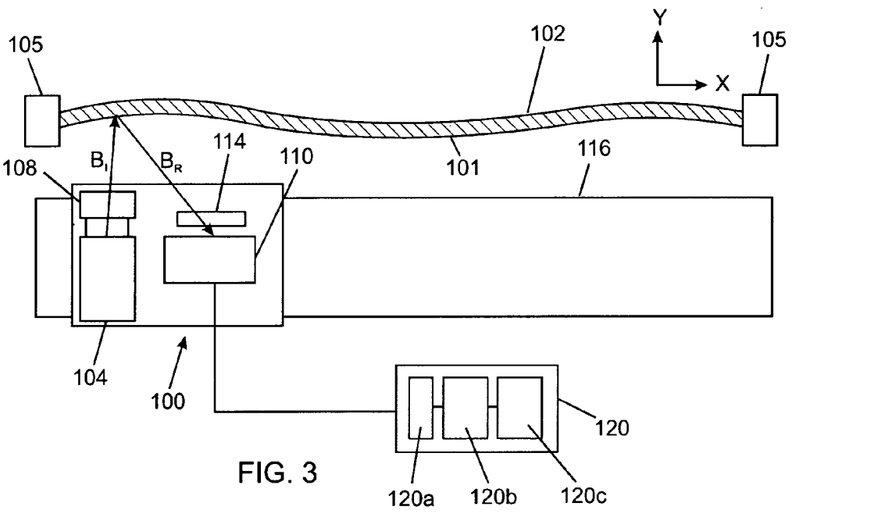
FIG. 3 is a top view of an apparatus for measuring a shape profile of a surface of a sheet of material.

FIG. 3 shows a top view of an apparatus 100 for measuring a shape profile of a surface of a sheet of material. In FIG. 3, the apparatus 100 is depicted in a position to measure a shape profile of the surface 101 of the sheet of material 102. The apparatus 100 includes a light source 104 in a generally opposing relation to the surface 101 of the sheet of material 102. The light source 104 provides a light beam, $B_I$, to be directed at the surface 101 of the sheet of material 102. The light source 104 may or may not include the active component(s) that generate the light beam. Where the active component that generates the light beam is remote from the light source 104, the light source 104 may include one or more passive components, such as lenses, mirrors, and fibers, optically coupled to the active component to direct the light beam at the surface 101. The light source 104 may also include one or more passive components even where the active component(s) are local. Regardless of whether the active component is local or remote, passive components may be used to perform various functions on the light beam generated by active components. In one example, a passive component may shape the output of an active component to achieve a light beam having a desired size and energy profile. In another example, a passive component, such as a beam splitter, may split the output of an active component into multiple light beams, thereby allowing the light source 104 to provide multiple light beams to be directed to the surface 101 of the sheet of material 102. In one example, the light source 104 includes a laser diode. The laser diode may be a collimated laser diode, a fiber-coupled laser diode, or a light source with less than 50 nm spectral line width. The laser diode may operate at continuous wave or may be pulsed. The light source 104 may provide a light beam or light beams with wavelength in a range from 400 nm to 1600 nm.

The light source 104 is mounted on or coupled to a linear translation stage, or linear slide, 116 that provides linear motion in at least one direction. The translation stage 116 may be one capable of providing linear motion along a single axis or along multiple axes. The translation stage 116 may be capable of providing incremental linear motion to allow better control of the shape profile measurement process. The translation stage 116 is positioned in a generally opposing relation to the surface 101 of the sheet of material 102 so that the light source 104 can be translated linearly over the surface 101, i.e., along the X-axis. The translation stage 116 may include capabilities to provide positional information of the light source 104 as the light source 104 is translated linearly over the surface 101. Alternatively, a position sensor (not shown) may be mounted on the translation stage 116 or light source 104 to provide such positional information. While the light source 104 is translated over the surface 101, the light source 104 provides a light beam, $B_I$, which is directed at the surface 101 of the sheet of material 102. Thus, the light beam, $B_I$, strikes the surface 101 at multiple positions as the light source 104 moves over the surface 101. At each position, the light beam, $B_I$, is incident on the surface 101 at a predetermined angle relative to the translation direction of the light source 104. The predetermined angle can be set by the launch angle of the light beam from the light source 104.

The apparatus 100 may include a beam shaper 108 positioned in the pathway of the light beam provided by the light source 104. The beam shaper 108 may be coupled to an output port of the light source 104, as shown in FIG. 3. Alternatively, the beam shaper 108 may be incorporated in the light source 104 as a passive component. The beam shaper 108 spreads a circular beam into an elongated beam, such as a substantially linear beam, an elongated elliptical beam, an elongated rectangular beam, and variations thereof. In one example, a major axis of the elongated beam is along the Z-axis, i.e., in a direction perpendicular to the translation direction of the light source 104. The beam shaper 108 may be placed on a rotational stage to align the major axis of the elongated beam with the Z-axis if necessary. Aligning the major axis of the elongated beam with the Z-axis allows a detection scheme that is insensitive to curvature variation along the Z-axis in the surface 101 of the sheet of material 102. In one example, the aspect ratio of the elongated beam is equal to or greater than 10. In another example, the aspect ratio of the elongated beam is equal to or greater than 100. In another example, the aspect ratio of the elongated beam is equal to or greater than 1000. The beam shaper 108 may also spread a circular beam into a cross-shaped beam having elongation in two orthogonal directions in order to allow an effective shape profile measurement scheme in two orthogonal directions.

In one example, the beam shaper 108, which is coupled to the light source 104 or provided as a component of the light source 104, is an optical diffuser with a special microstructure on its surface that redirects an input beam by changing the phase of each segment of the beam, such as available from MEMS Optical Inc., Huntsville, Ala. The structures that make a diffuser work are called scatter centers. These are the elementary surface units that direct incoming light rays into different directions. The clustering of millions of scatter centers over a large area combines to provide the scattering properties of the diffuser. The typical scatter center is a microlens element. To achieve greater than 90% conversion efficiency each scatter center is individually designed to implement a certain light-control task. When the surface structure as well as the statistical distribution of scatter centers is carefully designed and fabricated, a circular beam can be converted to a linear beam or cross-shaped beam, as described above.

The apparatus 100 includes a light detector assembly 110 for detecting and intercepting each reflected light beam, $B_R$. In the example shown in FIG. 3, the light detector assembly 110 includes multiple light receivers (not shown separately) placed within a single physical device. In one example, the light receivers are light detectors. The detector assembly 110 may also include one or more optical elements, such as lenses, for focusing light on the light detectors. One example of such a detector assembly 110 is a camera having a CCD array. In the example shown in FIG. 3, the light detector assembly 110 is mounted on or coupled to the translation stage 116, adjacent to the light source 104. In this arrangement, the detector assembly 110 travels in tandem with the light source 104 in order to detect and intercept reflected light beams from the surface 101 of the sheet of material 102. A narrow band pass filter 114 is coupled to or positioned adjacent to the detector assembly 110 such that it intercepts the reflected light beams prior to the detector assembly 110 intercepting the reflected light beams. The narrow band pass filter 114 removes/reduces noise due to background lighting from the reflected light beam, thereby improving the quality of measurements made by the detector assembly 110. As an example, the narrow band filter may filter out light in the visible and IR ranges. The narrow band pass filter 114 travels together with the detector assembly 110 in order to perform the noise removal/reduction at each position of the detector assembly 110. The narrow band pass filter 114 may also be provided as a component of the detector assembly 110.

Figure 4:
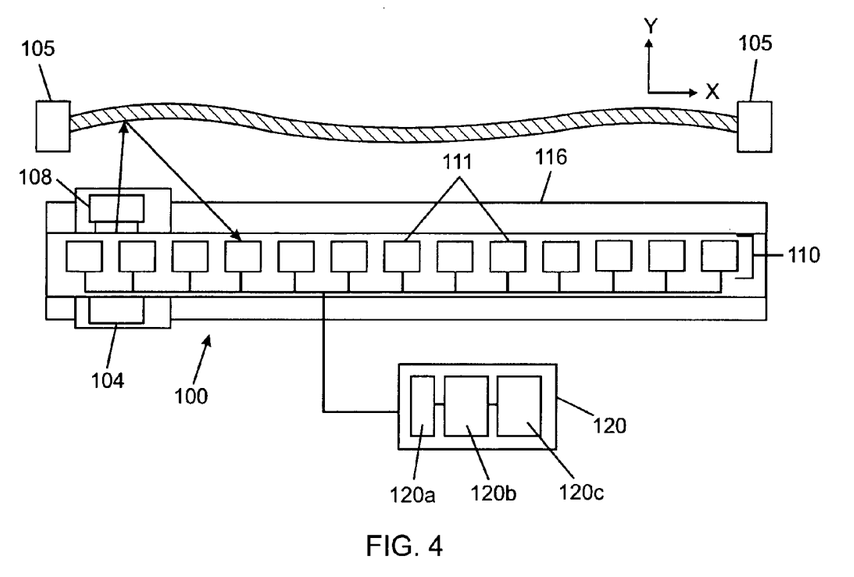
FIG. 4 shows the apparatus of FIG. 3 with a distributed detector array positioned above a light source.
Figure 5:
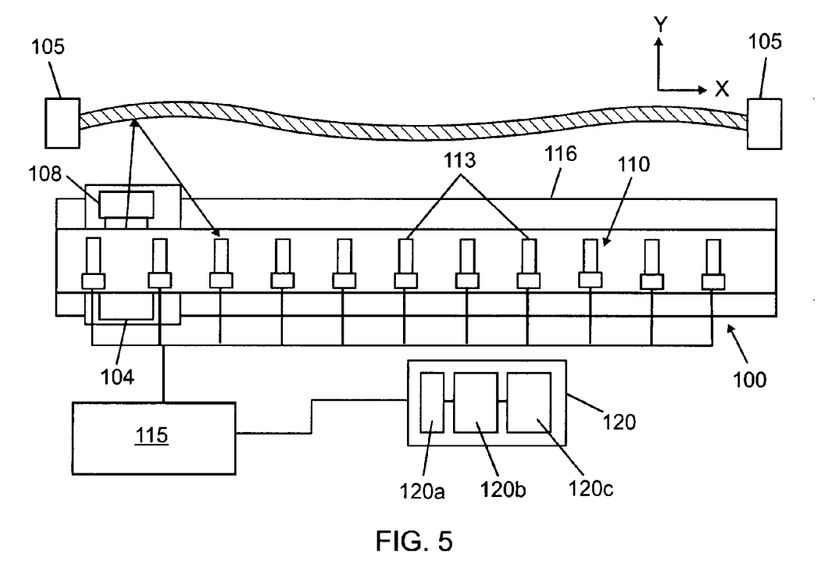
FIG. 5 shows the distributed detector array of FIG. 4 with optical fibers as detector elements.

FIG. 4 shows an example where the detector assembly 110 is a distributed array having multiple standalone light receivers 111. In one example, the standalone light receivers 111 are standalone light detectors. The standalone detectors 111 are distributed along a path substantially parallel to the translation direction of the light source 104. In one example, the standalone detectors 111 are stationary and do not move with the light source 104. In this arrangement, each individual detector detects and intercepts reflected light beams from a certain range of the surface 101 of the sheet of material 102. Each detector may be a self-contained detector with small size, for example, on the order of 1 mm in dimension. Alternatively, as shown in FIG. 5, the detector assembly 110 may be a distributed array having multiple light receivers 113, wherein each light receiver 113 is a segment of a multimode fiber 113 that will guide the light to a light detector 115 in the backend. In FIG. 4, each individual detector 111 may be provided with a narrow band pass filter, as described above, to remove/reduce noise due to background lighting from the reflected light beams. In FIG. 5, the multimode fibers 113 may provide the desired filtering function.

Figure 6:
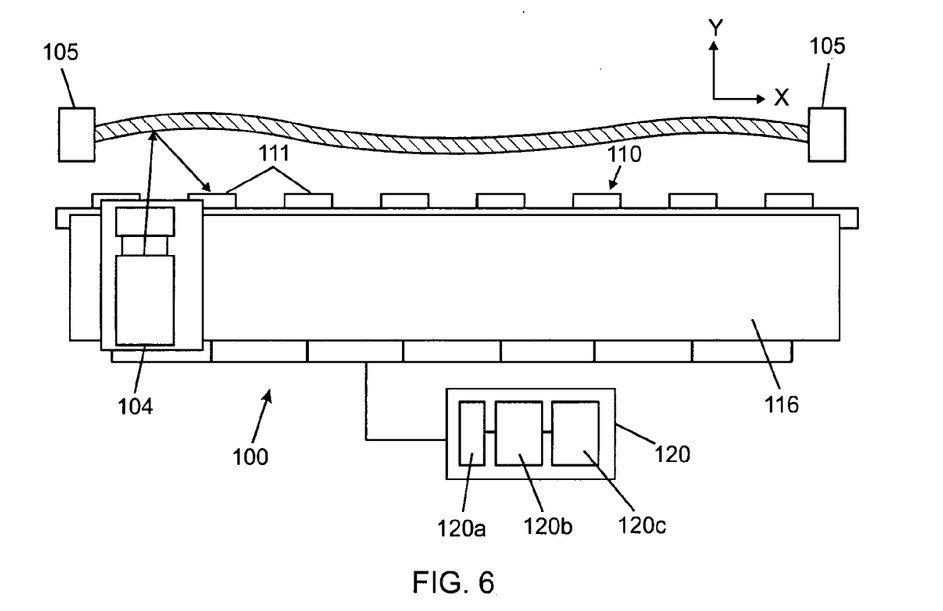
FIG. 6 shows the apparatus of FIG. 3 with a distributed detector array positioned below a light source.
Figure 7A:
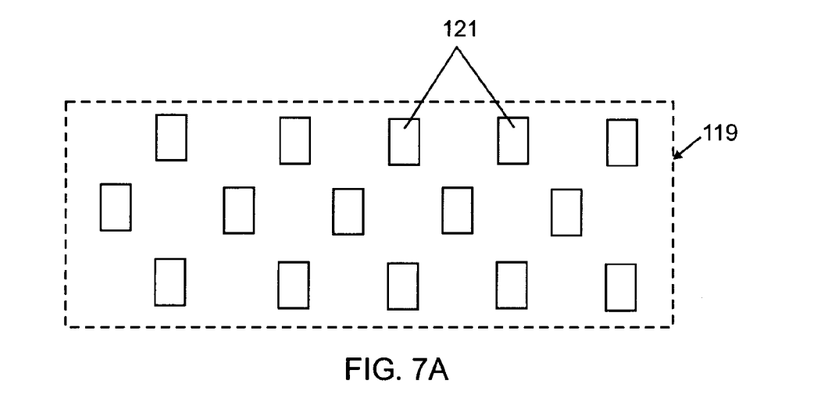
FIGS. 7A and 7B show a two-dimensional detector array for use with the apparatus of FIG. 3.
Figure 7B:
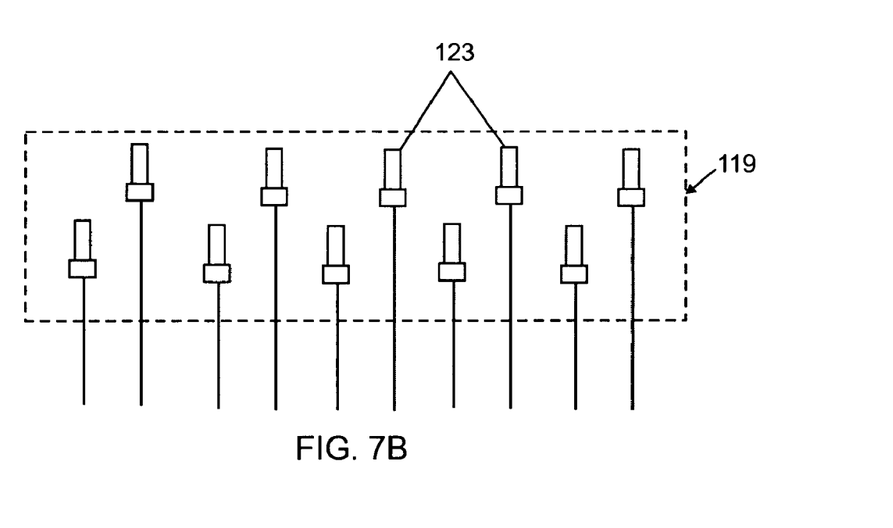

In the examples shown in FIGS. 4 and 5, the distributed detector/receiver array 110 is positioned above the light source 104. In FIG. 6, the distributed detector/receiver array 110 is positioned below the light source 104. In general, any arrangement of the distributed detector/receiver array 110 that allows detection and interception of reflected beams at each desired position along the translation direction of the light source 104 may be used. The distributed detector/receiver array 110, as illustrated in FIGS. 4, 5, and 6, enables a scalable shape profile measurement system. As many standalone detectors as desired can be arranged along the translation direction or travel path of the light source 104 in order to detect and intercept reflected light beams. Moreover, the distributed detector/receiver array 110 does not have to be limited to a one-dimensional array, as shown in FIGS. 4, 5, and 6. For example, FIG. 7A shows a two-dimensional array 119 including multiple rows of detectors 121 in a staggered arrangement. The detectors 121 may also be in a non-staggered arrangement. FIG. 7B shows the two-dimensional array 119 with multimode fibers 123, wherein the multimode fibers can be connected to a backend detector as previously described. Two-dimensional detector arrays such as depicted in FIGS. 7A and 7B may be positioned along a travel path or translation direction of the light source 104 in order to detect and intercept reflected light beams from the surface 101 of the sheet of material 102.

In one example, the resolution of the apparatus 100 is defined as the minimum detectable position difference along the Y-axis, or a direction perpendicular to the translation direction of the light source 104. The resolution is determined by the resolution of the detectors of the detector assembly 110 and the beam size of the reflected beam on the detectors along the X-axis or translation direction of the light source 104, i.e., the beam width. An additional lens or optical component may be used to make the beam on the detector as small as possible. The size of the detectors/receivers in the detector assembly 110 may be selected to be smaller than the beam size to achieve a device resolution similar to the beam size. At the same time, the beam size on the surface 101 of the sheet of material 102 along the Z-axis should be sufficiently long so that even the largest motion along the Z-axis does not move the beam out of the detection range. As previously explained, this may be achieved by elongating the beam provided by the light source 104 in the Z direction, or in a direction perpendicular to the translation direction of the light source 104. In one example, the beam size, or width, along the X-axis is equal to or less than 3 mm. In another example, the beam size, or width, along the X-axis is equal to or less than 2 mm. In another example, the beam size, or width, along the X-axis is equal to or less than 1 mm. In yet another example, the beam size, or width, along the X-axis is equal to or less than 0.5 mm. In one example, the aspect ratio of the elongated beam is at least 10. In another example, the aspect ratio of the elongated beam is equal to or greater than 100. In yet another example, the aspect ratio of the elongated beam is equal to or greater than 1000. The size or spacing of the detectors in the detector assembly 110 should be smaller than the beam width.

The apparatus 100 further includes a data acquisition system 120 which receives or registers information related to the position of the detectors/receivers associated with the detector assembly 110 as they detect and intercept reflected light beams and information related to the position of the light source 104 as it provides an incident light beam. The position information may be collectively referred to as the reflected beam data. The data acquisition system 120 may include an input/output interface 120a for communication with the detector assembly 110 and the translation stage 116 or a position sensor coupled to the translation stage 116 or light source 104. The data acquisition system 120 may further include a data acquisition device 120b for recording the reflected beam data. The data acquisition system 120 may further include a data analysis device 120c for processing the reflected beam data. The data analysis device 120c may be a data processor that executes instructions related to processing of the reflected beam data. Processing of the reflected beam data may include correlating the reflected beam data to the shape profile of the glass sheet 102. Processing of the reflected beam data may also include removing noise from the reflected beam data. In cases were a distributed detector array is used as the detector assembly 110, the data acquisition system 120 automatically switches between the standalone detectors to collect reflected beam data for a range of positions on the surface 101 of the sheet of material 102. The data acquisition system 120 may additionally stitch the different data from the standalone detectors together to allow determination of a complete shape profile of the surface of the sheet of material. A process for correlating the reflected beam data to shape profile that could be implemented by the data analysis device 120c will now be described.

Figure 8A:
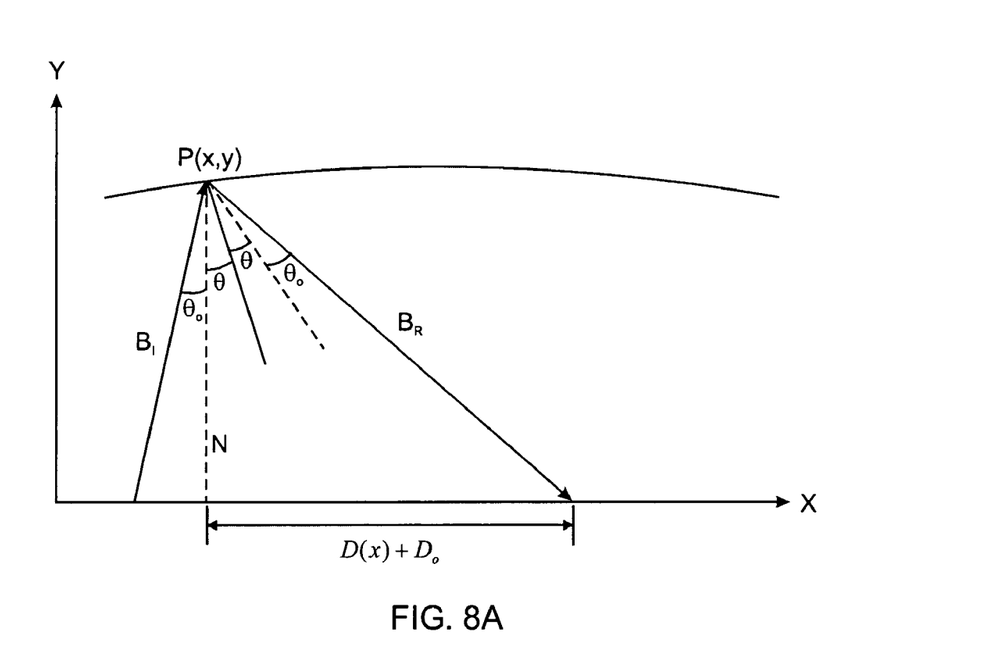
FIGS. 8A and 8B illustrate a process of measuring a shape profile of a surface of a sheet of material using the apparatus of FIG. 3.

FIG. 8A is a schematic of a process for measuring a shape profile of a surface of a sheet of material using a moving light source and a moving detector assembly including multiple detectors placed within a single physical device. In FIG. 8A, y(x) represents the shape profile of a surface of a sheet of material in the XY plane. Further, $\theta_0$ represents the angle at which a light beam $B_I$ is incident on the surface of the sheet of material, where $\theta_0$ is measured relative to the normal N to the glass sheet at position x. If the launch angle of the light beam from the light source is known, then $\theta_0$ will also be known. Using this nomenclature, the reflected light beam, $B_R$, makes an angle $2\theta+\theta_0$ with the normal to the surface of the sheet of material at position x. For convenience a reference point around the light source may be chosen to record the position difference $D(x)$ between the intercepted reflected laser beam and the incident light beam. The absolute position difference at each position x would then be the sum of position difference, $D(x)$, and an offset, $D_0$, between the reference point and x, i.e., $D(x)+D_0$. $D(x)+D_0$ represents the position difference between the point at which a light beam is launched from the light source and the point at which a corresponding light beam is intercepted and detected by the detector at each position x of the light source.

The relationship between the position difference and shape profile of the surface of the sheet of material can be expressed as:

$$D_o + D(x) = y(x)\tan(2\theta + \theta_o) \tag{1}$$

or $$D_o + D(x) = y(x)\frac{2y'(x) + \tan(\theta_o)(1 - y'^2(x))}{1 - y'^2(x) + 2y'(x)\tan\theta_o} \tag{2}$$

where $y'(x)=\tan \theta$ and $y'(x)$ is the derivative of the sheet profile $y(x)$. Equation (2) is a rigorous differential equation describing the relation between the measured position difference and the shape profile $y(x)$. In most cases, $y'(x)$ is a small quantity so that the second order contributions can be ignored when equation (1) is expanded, allowing equation (2) to be simplified as follows:

$$y'(x) = \frac{D(x) + D_o}{2y(x)} - \frac{\tan\theta_o}{2} \tag{3}$$

or $$y'(x) = \frac{D(x) + D_o}{2y(x)} - \frac{C_o}{2} \tag{4}$$

where $C_0=\tan \theta_0$.

Figure 9:
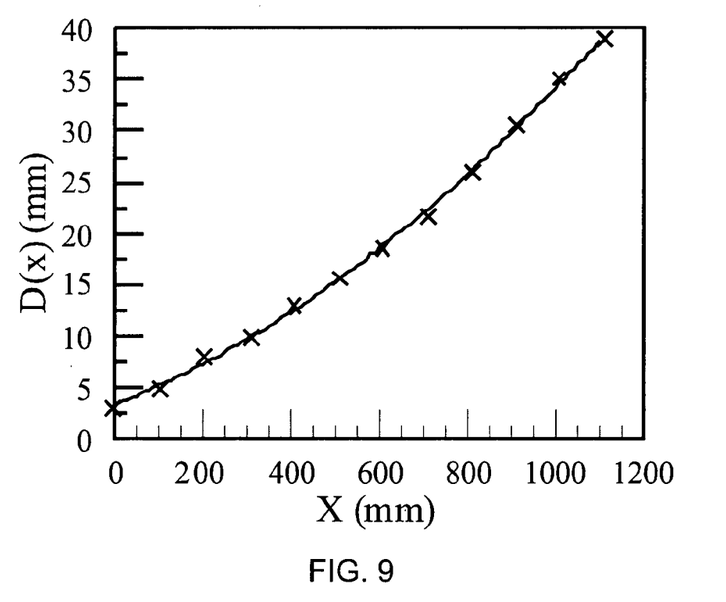
FIG. 9 is a graph depicting position difference of reflected light beams relative to a reference point determined by the location of a light source, as measured using the apparatus of FIG. 3.
Figure 10:
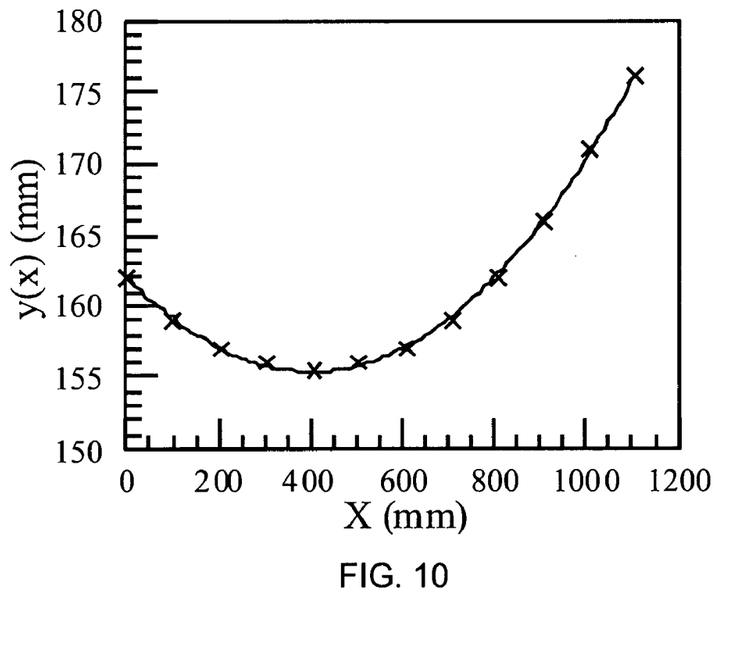
FIG. 10 is a graph depicting measured shape profile of a surface of the reference glass sheet of FIG. 9.
Figure 11:
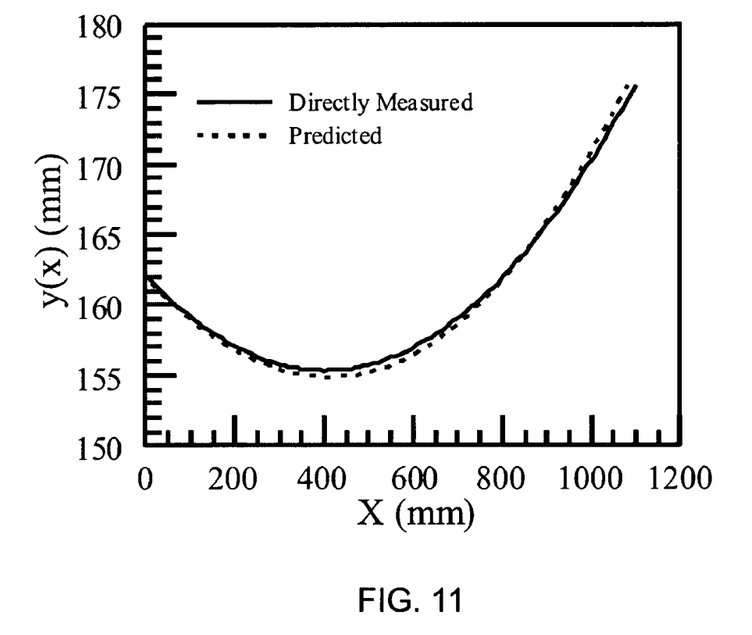
FIG. 11 is a graph comparing measured shape profile of the referenced sheet of glass, as in FIG. 10, with a predicted shape profile.

In equation (4), $D_0$, $C_0$, and the shape profile at the initial position, $y(x_0)$, are needed in order to recover the shape profile $y(x)$ from the measured position difference $D(x)$. The system may be pre-calibrated to determine these parameters. There are multiple ways to conduct the pre-calibration. One direct method is to measure $D_0$ and $C_0$ based on their actual physical meaning, i.e., the offset between the local coordinate system and the absolute coordinate system and the tan function of the incident angle, $\tan(\theta_0)$, respectively. Another method is by firmly attaching a sheet of material to a reference bar having a known shape profile in the XY plane. The reference bar and sheet of material are installed on the machine on which future shape profile measurements are intended to be made. The shape profile of the surface of the sheet of material attached to the reference bar is measured directly from the imaging plane. The position difference $D(x)$ as a light beam is swept across the sheet of material is also measured. In one example, a reference bar having a bell shape and a sheet of material made of glass was used. FIG. 8A shows the position difference $D(x)$ as a function of position on the X-axis. FIG. 9 shows the measured shape profile, $y(x)$. From FIG. 9, $y(x_0)$ is known. However, $D_0$ and $C_0$ are not known. To determine $D_0$ and $C_0$, a best fit analysis between the measured $y(x)$ and predicted $y(x)$ according to equation (4) was used. $D_0$ was found to be 12.837775 and $C_0$ was found to be 0.165464. With the calibration-ready data, the shape profile of the surface of the sheet of material was predicted by integrating equation (4). The comparison of the directly measured shape profile and the predicted shape profile are shown in FIG. 10. The maximum discrepancy between the directly measured shape profile and the predicted shape profile was about 1 mm. The high degree of agreement demonstrates the feasibility of the proposed scheme. The values calculated for $D_0$ and $C_0$ are good for determining the shape profile of the surface of any sheet of material, provided the setup for determining the shape profile is the same as that used when calculating $D_0$ and $C_0$. Alternative methods for determine the parameters $D_0$, $C_0$, and $y(x_0)$ include identifying at least three independent conditions that are related to $D_0$, $C_0$, and $y(x_0)$ and solving for them.

Figure 8B:
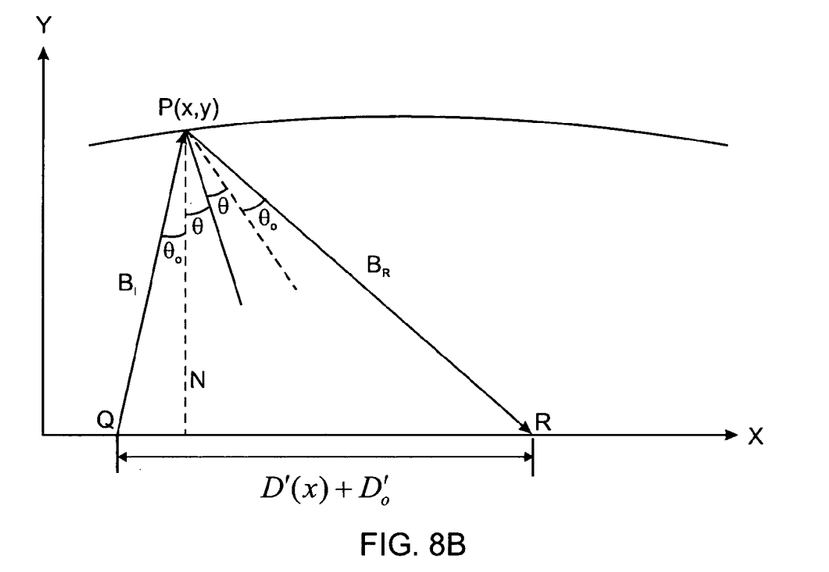

Referring to FIG. 8B, in another example, it is convenient to measure the position difference or distance between the point Q, where a light beam $(B_I)$ is launched at the surface of the sheet of material, and point R, the position at which the corresponding reflected light beam $(B_R)$ is intercepted and detected, in order to uncover the shape profile of the surface of the sheet of material. In this example, the position difference between Q and R can be expressed as:

$$D'_0 + D'(x) = y(x)(\tan(\theta_0) + \tan(2\theta + \theta_0)), \tag{5}$$

or $$D'_0 + D'(x) = y(x)\left(\tan(\theta_0) + \frac{2y'(x) + \tan(\theta_0)(1 - y'^2(x))}{1 - y'^2(x) + 2y'(x)\tan\theta_0}\right) \tag{6}$$

The shape profile of the sheet of material can be uncovered by integrating Eq. (6) with initial condition $y(x_0)$ and pre-calibrated parameters $D'_0$ and $\tan(\theta_0)$.

Figure 12A:
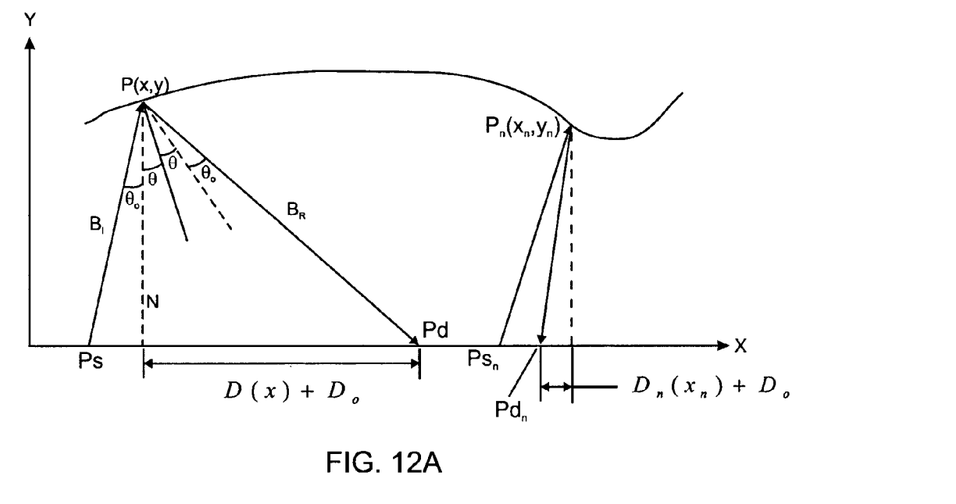
FIGS. 12A and 12B illustrate a process of measuring a shape profile of a surface of a sheet material using the apparatus of FIG. 4, 5, or 6.
Figure 12B:
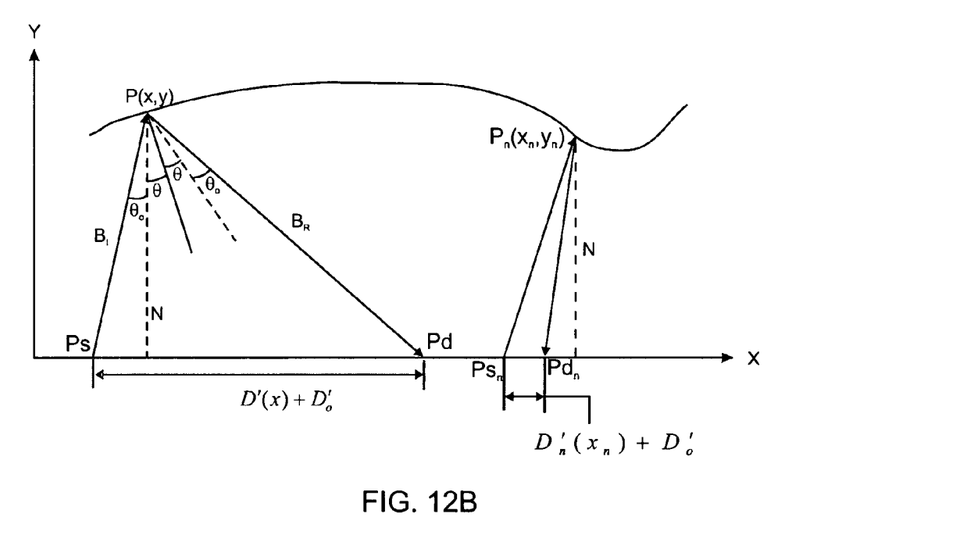

FIG. 12A is a schematic of measuring a shape profile of a surface of a sheet of material using a moving light source and multiple stationary light detectors/receivers distributed along the travel path or translation direction of the moving light source. A plurality of stationary light detectors/receivers located at different locations along X-axis is used to detect relative position of the reflected beam to the light source. The shape profile is obtained by collecting reflected beam positions at multiple detectors. Each detector/receiver has only one detector/receiver element and is lighted up when the reflected beam reaches it. Once the detector/receiver detects the reflected beam, the data acquisition system locates the location of the light source. For example, when the reflected beam is detected by a detector/receiver located at Pd, the data acquisition device locates the light source location at P(x,y), then the difference between them is $D(x)+D_0$. Similarly, at point $P_n(x_n,y_n)$, the difference is $D_n(x_n)+D_0$. After collecting the differences over the surface of the sheet of material, the shape profile can be calculated using the method above. In a manner similar to the one described in FIG. 8B, it may also be convenient, as illustrated in FIG. 12B, to measure the position difference between the point Ps, where a light beam $(B_I)$ is launched at the surface of the sheet of material, and point Pd, the position at which the corresponding reflected light beam $(B_R)$ is detected/received, in order to uncover the shape profile of the surface of the sheet of material.

Referring again to FIG. 3, a method for online measurement of a shape profile of a surface 101 of a sheet of material 102 includes positioning the apparatus 100 at a desired position along the sheet of material 102. The light source 104 is operated such that it provides a light beam that is incident on the surface 101 of the sheet of material 102. The linear translation stage 116 is operated to move the light source 104 such that the incident light beam is swept substantially linearly over the surface 101 of the sheet of material 102. The incident light may strike the surface 101 of the sheet of material 102 at any desired angle. While the incident light beam is being swept over the surface 101 of the sheet of material 102, the light detector 110 detects beams reflected from the surface 101 of the sheet of material 102. The data acquisition system 120 collects the reflected beam data, as previously explained. The data acquisition system 120 then correlates the reflected beam data to the shape profile of the surface 101 of the sheet of material 102.

Figure 13:
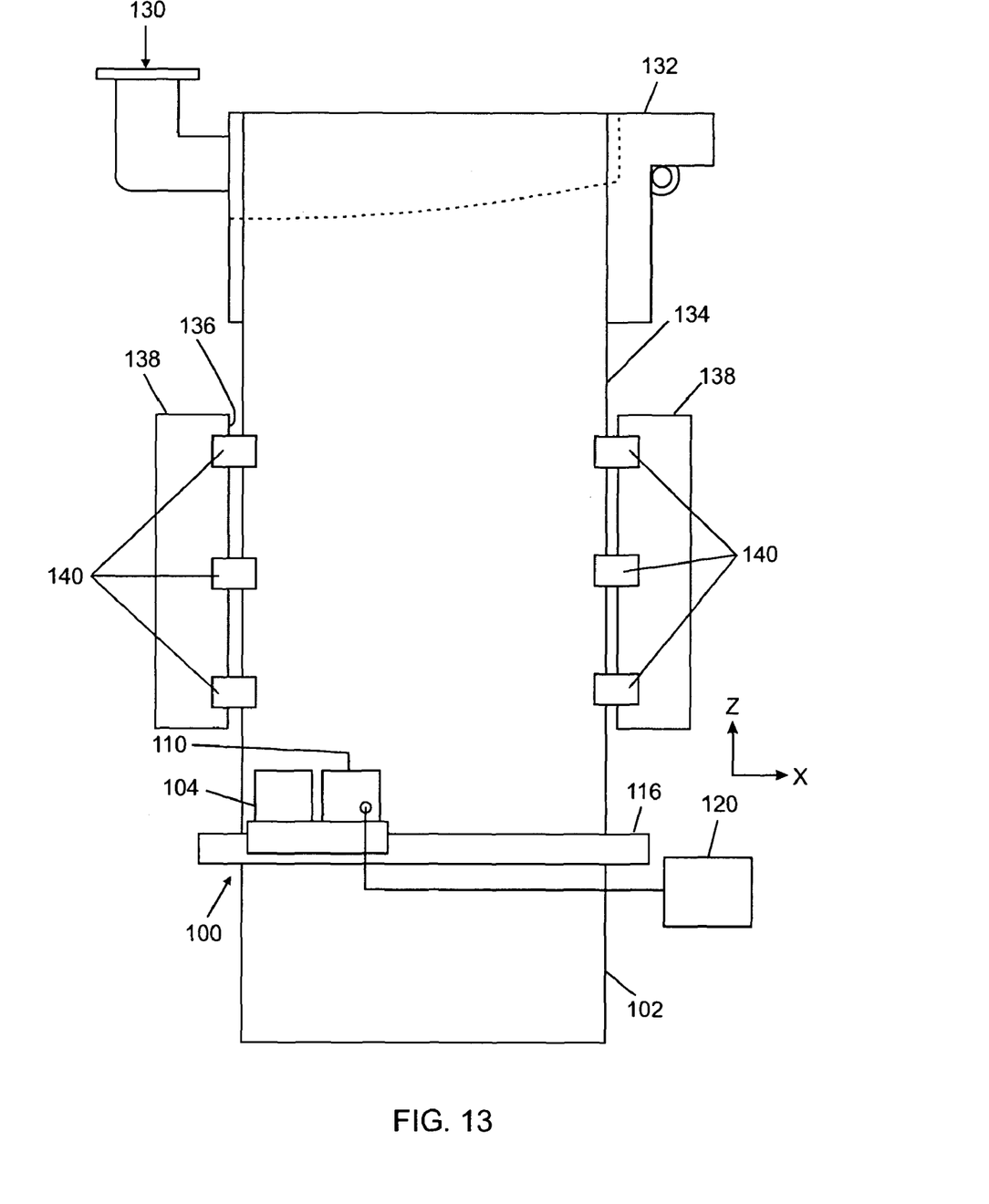
FIG. 13 illustrates a fusion draw machine in combination with the apparatus of FIG. 3.

The apparatus 100 is useful for online and offline measurement of shape profiles of a surface of a sheet of material. In one example, the apparatus is used for online measurement of a sheet of material produced by a fusion draw process. In this example, as illustrated in FIG. 13, molten glass or other viscous material 130 flows into a fusion pipe 132 and overflows down the sides of the fusion pipe 132 to form a sheet-like flow 134, which is received in a channel 136. The channel 136 is defined by a pair of elongated guide members 138 arranged in parallel. The channel 136 may be vertical or may have other orientation, for example, horizontal or inclined. Rollers 140 arranged along the guide members 138 grip the side edges of the sheet-like flow 134 and draw the sheet-like flow 134 into a sheet of material 102. The fusion pipe 132, guide members 138, rollers 140, and channel 136 may be a part of a fusion draw machine. The apparatus 100 may be provided at the bottom of the channel 136 or along the channel 136 to determine the shape profile of the sheet of material 102. The apparatus 100 may be used to determine the shape profile of a surface of the sheet of material 102 while the sheet of material 102 is stationary or being drawn.

The apparatus 100 could be used as part of a system for separating the sheet of material 102. A system for separating the sheet of material 102 may be one based on a travel anvil method. In this method, a scoring device (not shown) is mounted on a traveling carriage (not shown) and translated across the width of the sheet of material 102 to score the sheet of material 102. A nose device (not shown) is typically used to oppose the force of the scoring device. Where the shape profile of the surface of the sheet of material 102 is available via the apparatus 100, the shape profile can be used to control how much force is delivered by the scoring device and nose device to the sheet of material such that sheet motion is minimized.

The description above focuses on using a single light source and multiple detectors/receivers to obtain the shape profile of a surface of a sheet of material. Multiple units of light source/detectors combination can be used to enhance the functionality of the system. In this case, each light source/detectors combination can have a relatively narrow dynamic range but with a higher resolution, and the measurements from each combination can be stitched together to obtain a complete shape profile of the sheet of material. Multiple light source/detectors combinations can also be installed along the Z-axis, as opposed to along the X-axis, to discover variations in glass sheet profile along the Z-axis. Other variations include suitably adjusting the initial incident angle of the light source which provides a light beam to the surface of the sheet of material to be measured.

We claim:

1. A method for measuring the shape profile of a surface of a glass sheet comprising:
flowing molten glass into a fusion pipe and overflowing the molten glass from the fusion pipe to form a sheet-like flow; receiving the sheet-like flow in a channel and drawing the sheet-like flow into a glass sheet; measuring a shape profile of a surface of the glass sheet while the glass sheet is being drawn, the measuring comprising: positioning an apparatus comprising a light source along or at a bottom of the channel and operating the apparatus to provide an elongated light beam that is incident on the surface of the glass sheet and has elongation in at least one direction;
translating the elongated incident light beam substantially linearly over the surface in a predetermined measurement direction such that the elongated incident light beam is incident on the surface of the glass sheet at multiple positions and produces a reflected light beam at each of the multiple positions, wherein a major axis of the elongated incident light beam is perpendicular to a direction in which the elongated incident light beam is translated during the translating;
intercepting the reflected light beam produced at each of the multiple positions;
receiving information related to the position difference between the intercepted reflected light beams and the incident light beam at each of the multiple positions; and
correlating the position difference information to the shape profile of the surface of the glass sheet.

2. The method of claim 1, wherein correlating the position difference data to the shape profile comprises resolving $$D_o + D(x) = y(x) \frac{2y'(x) + \tan\theta_o(1 - y'^2(x))}{1 - y'^2(x) + 2y'(x)\tan\theta_o}$$

for y(x), where y(x) is the shape profile, y'(x) is the derivative of y(x), $D(x)+D_o$ is the position difference between the intercepted reflected light beam and the incident light beam at each of the multiple positions, and $\theta_o$ is the angle at which the light beam is incident on the surface of the glass sheet.

3. The method of claim 1, wherein the elongated light beam has an aspect ratio of at least 10.

4. The method of claim 1, wherein the elongated light beam is a cross-shaped beam having elongation in two orthogonal directions.

5. The method of claim 4, wherein providing the elongated light beam comprises passing a circular beam through a beam shaper that spreads the circular beam into the cross-shaped beam.

* * * * *